United States Patent [19]
Yoshida et al.

[11] Patent Number: 5,699,423
[45] Date of Patent: Dec. 16, 1997

[54] TELEPHONE SET IN WHICH AN ECHO SIGNAL IS EFFECTIVELY CANCELLED IN SPITE OF BEING PROVIDED WITH A PLURALITY OF SOUND PRODUCING UNITS

[75] Inventors: Toshio Yoshida; Michitaka Sisido, both of Tokyo, Japan

[73] Assignee: NEC Corporation, Tokyo, Japan

[21] Appl. No.: 407,453

[22] Filed: Mar. 20, 1995

[30] Foreign Application Priority Data

Mar. 18, 1994 [JP] Japan .................... 6-048128

[51] Int. Cl.$^6$ .................................. H04M 9/08
[52] U.S. Cl. .................. 379/390; 379/388; 379/406; 379/410; 379/420
[58] Field of Search ................ 379/406, 410, 379/411, 409, 420, 390, 389, 388, 387; 307/37.1

[56] References Cited

U.S. PATENT DOCUMENTS

| | | | |
|---|---|---|---|
| 4,847,887 | 7/1989 | Suzuki et al. | 379/58 |
| 4,905,270 | 2/1990 | Ono | 379/58 |
| 5,239,586 | 8/1993 | Marui | 381/47 |
| 5,263,079 | 11/1993 | Umemoto | 379/390 X |
| 5,313,498 | 5/1994 | Sano | 379/410 X |
| 5,353,348 | 10/1994 | Sendyk et al. | 379/410 |
| 5,379,338 | 1/1995 | Umemoto et al. | 379/420 X |
| 5,384,843 | 1/1995 | Masuda et al. | 379/391 |
| 5,400,399 | 3/1995 | Umemoto et al. | 379/388 |
| 5,559,793 | 9/1996 | Maitra et al. | 379/410 X |

FOREIGN PATENT DOCUMENTS

| | | |
|---|---|---|
| 0518383 | 12/1992 | European Pat. Off. . |
| 3-114344 | 5/1991 | Japan . |
| 2278754 | 12/1994 | United Kingdom . |

*Primary Examiner*—Krista Zele
*Assistant Examiner*—Devendra T. Kumar
*Attorney, Agent, or Firm*—Sughrue, Mion, Zinn, Macpeak & Seas, PLLC

[57] ABSTRACT

In a telephone set having a receiver (42) and a loudspeaker (39), a switch circuit (37) selects supply of a reception speech signal, transmitted from a counterpart section (60), to the receiver or the loudspeaker in response to a selection signal. A first adaptive echo canceller (43a) produces a pseudo echo signal with reference to the reception speech signal. A controller (44) controls operation of the first adaptive echo canceller in response to the selection signal to optimize the pseudo echo signal. A first digital adder (35a) carries out a particular calculation between the pseudo echo signal and a transmission speech signal, relating to the transmission sound supplied to a microphone (46). The adder produces a particular calculation result signal representative of a result of the particular calculation. In accordance with the particular calculation result signal, a transmission is carried out towards the counterpart section.

11 Claims, 2 Drawing Sheets

5,699,423

TELEPHONE SET IN WHICH AN ECHO SIGNAL IS EFFECTIVELY CANCELLED IN SPITE OF BEING PROVIDED WITH A PLURALITY OF SOUND PRODUCING UNITS

BACKGROUND OF THE INVENTION

This invention relates to a telephone set including a plurality of sound producing units for producing various reception speech sounds in response to a reception speech signal which is received by the telephone set.

Such a telephone set comprises, as the sound producing units, a receiver and a loudspeaker which are known in the art. The loudspeaker and the receiver are for producing a first and a second reception speech sound which are different from one another in volume level. In use of the telephone set, one of the loudspeaker and the receiver is selected by a user. As a result, the user can hear, as a selected sound, one of the first and the second reception speech sounds.

The telephone set further comprises a microphone for converting a transmission speech sound into a local signal used for producing a processed transmission signal which will be transmitted from the telephone set in the manner known in the art. The microphone is placed in vicinity of the loudspeaker and the receiver. In this arrangement, it is assumed that the selected sound has a part supplied to the microphone together with the transmission speech sound. In this event, the microphone generates a noise signal or an echo signal which is included in the local signal. It is therefore preferable to cancel or delete the the echo signal from the local signal.

In order to cancel the echo signal from the local signal, various proposals have been made of a mobile telephone set comprising an echo canceller known in the art. A typical one of the proposals is disclosed in Japanese Patent Prepublication (Kokai or Publication of Unexamined Patent Application) No. 114344/1991 which will later be described in detail with reference to the drawing. In the mobile telephone set of the typical proposal, it is sufficient to cancel the echo signal that is generated dependent on the first reception speech sound.

However, it is not suitable to cancel the echo signal that is generated dependent on the second reception speech sound. This is because the echo canceller is not designed to take into consideration the first and the second reception speech sounds.

SUMMARY OF THE INVENTION

It is therefore an object of this invention to provide a telephone set in which cancellation is favorably carried out on an echo signal in spite of the user's using a selected one of a plurality of sound producing units having various volume levels.

It is another object of this invention to provide a telephone set of the type described, in which the cancellation has an operation controlled in response to the selected one of the sound producing units.

Other objects of this invention will become clear as the description proceeds.

According to this invention, there is provided a telephone set comprising first sound producing means responsive to a reception speech signal for producing a first reception speech sound, second sound producing means responsive to said reception speech signal for producing a second reception speech sound which is greater in volume level than said first reception speech sound, selecting means connected to said first and said second sound producing means and responsive to a selection signal for selecting supply of said reception speech signal between said first and said second sound producing means, converting means for converting a transmission speech sound into a transmission speech signal, particular adjusting means connected to said converting means for adjusting said transmission speech signal with reference to said reception speech signal, and control means connected to said particular adjusting means and responsive to said selection signal for controlling operation of said particular adjusting means.

According to this invention, a method of cancelling an echo signal in a telephone set comprising first sound producing means responsive to a reception speech signal for producing a first reception speech sound, second sound producing means responsive to said reception speech signal for producing a second reception speech sound which is greater in volume than said first reception speech sound, selecting means connected to said first and said second sound producing means and responsive to a selection signal for selecting supply of said reception speech signal between said first and said second sound producing means, converting means for converting a transmission speech sound into a transmission speech signal, and particular adjusting means connected to said converting means for adjusting said transmission speech signal with reference to said reception speech signal, said method comprising the step of controlling operation of said particular adjusting means in response to said selection signal.

DESCRIPTION OF THE PREFERRED EMBODIMENT

Figure 1:
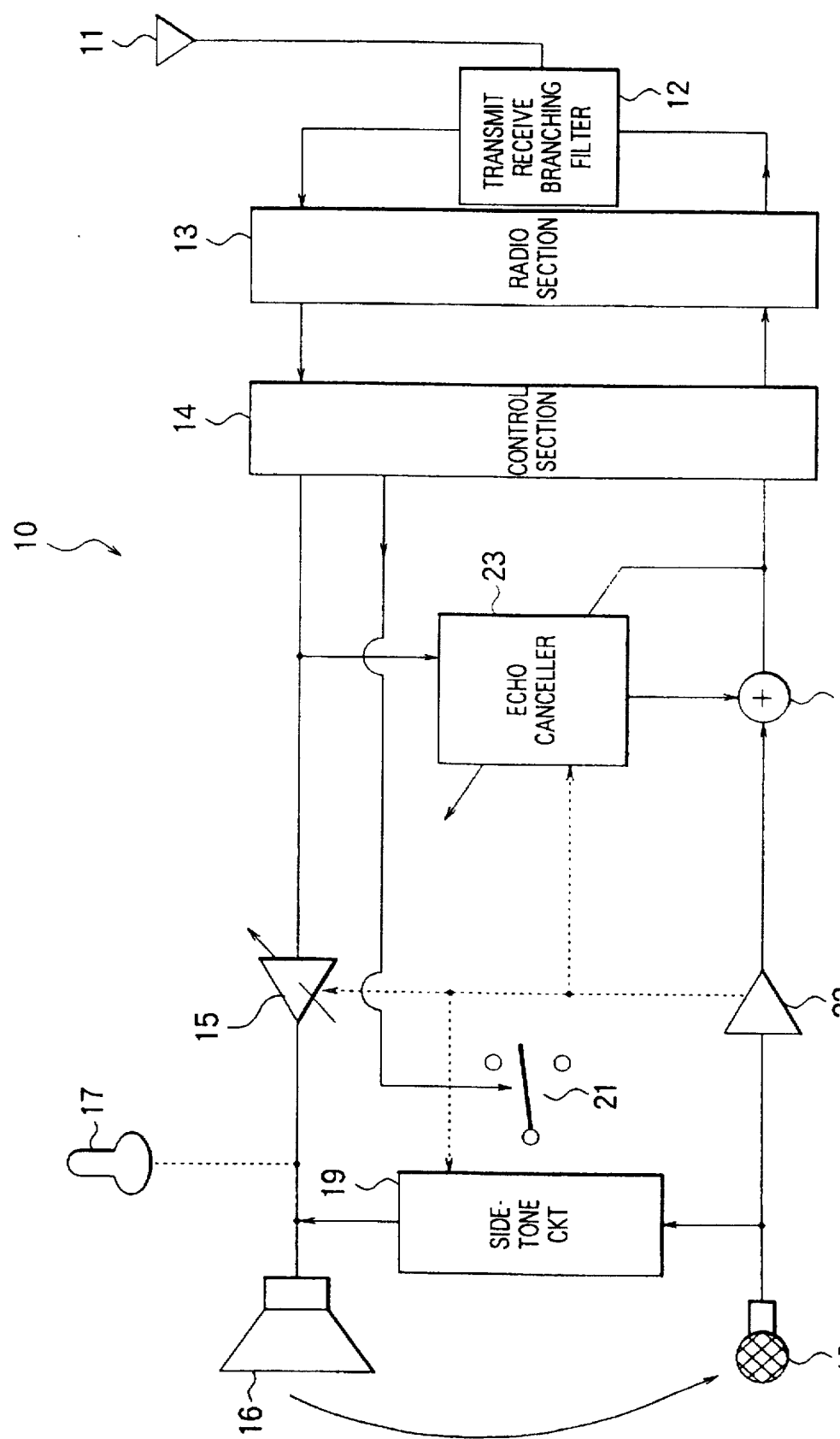
FIG. 1 is a block diagram of a conventional telephone set.

Referring first to FIG. 1 for a better understanding of the present invention, description will be made with regard to a conventional telephone set 10. The telephone set 10 is portable and generally called a hands-free type. The telephone set 10 corresponds to the prior art example referred to above.

In FIG. 1, the telephone set 10 comprises an antenna 11 for radiating a speech transmission radio wave and for receiving a speech reception radio wave as a speech reception radio signal, a transmit-receive branching filter 12 for separating a speech transmission radio signal to be transmitted to the antenna 11 and the speech reception radio signal, a radio section 13 for converting the speech reception radio signal separated by the transmit-receive branching filter 12 into a speech reception baseband signal and for converting a speech transmission baseband signal into the speech transmission radio signal, a control section 14 for controlling the telephone set, a variable resistor 15 for varying a level of a speech reception signal, a loudspeaker 16 and an earphone 17 for converting the speech reception signal produced from the variable resistor 15 into a reception speech sound, a microphone 18 for converting a transmission speech sound into a speech transmission signal, a sidetone circuit 19 for leaking the speech transmission signal towards the loudspeaker 16, a selection switch 21 for switching between a hands-free communication mode and a handset communication mode, an amplifier 22 for amplifying the speech transmission signal, an echo canceller 23 for estimating a transfer characteristic of an acoustic echo path with reference to the speech reception baseband signal to produce a pseudo echo signal, and an adder 24 for subtracting the pseudo echo signal from an output of the amplifier 22 to produce the speech transmission baseband signal.

Next, the description will proceed to an operation of the telephone set 10. When the selection switch 21 is switched into the handset communication mode, the sidetone circuit 19, which is for transmitting a part of the speech transmission signal to the loudspeaker 16 as a sidetone signal, is turned on with the echo canceller 23 turned off.

On the other hand, when the selection switch 21 is switched into the hands-free communication mode, the sidetone circuit 19 is turned off with the echo canceller 23 turned on. The echo canceller 23 is responsive to the speech reception signal from a counterpart telephone set or terminal (not shown) and produces an optimized pseudo echo signal. After being reproduced by the loudspeaker 16, the reception speech sound has a part which enters into or is supplied to the microphone 18 together with the transmission speech sound. As a result, the microphone 18 generates a noise signal or an acoustic echo signal which is included in the speech transmission signal. After being amplified by the amplifier 22, the speech transmission signal is supplied to the adder 24. The adder 24 subtracts the optimized pseudo echo signal from the speech transmission signal to cancel the acoustic echo signal. As a result, the adder 24 has an output fed back to the echo canceller 23. The echo canceller 23 optimizes the pseudo echo signal so as to minimize the acoustic echo signal. By repeating the above-mentioned operation, the acoustic echo signal is prevented from being transmitted to the counterpart terminal.

As described above, the echo canceller 23 has been used in the hands-free communication mode alone, not in the handset communication mode. In the handset communication mode, however, generation of the acoustic echo signal is not completely inhibited. If the amount of the acoustic echo signal is increased in the handset communication mode, the transmission speech sound uttered by a speaker himself is returned. This results in giving a strange feeling to the speaker.

Figure 2:
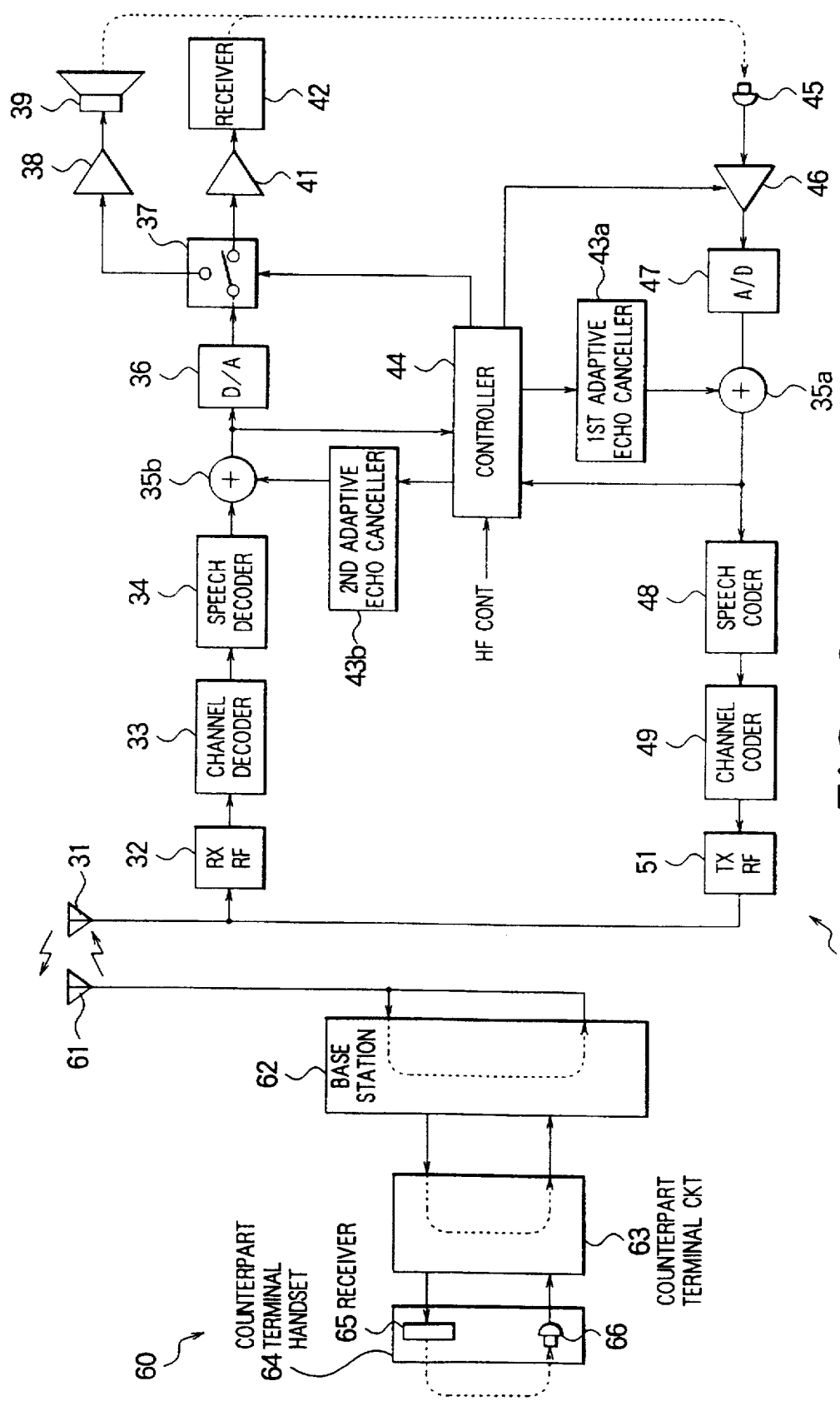
FIG. 2 shows, together with a counterpart telephone set, a block diagram of a telephone set according to an embodiment of this invention.

Turning to FIG. 2, the description will be directed to a digital mobile telephone set 30 as a telephone set according to an embodiment of this invention, and a counterpart section 60 which is communicable with the digital mobile telephone set 30 through a radio channel in the manner known in the art.

In mobile communication, use is made of a system such that a service area extending over a wide range is divided into several areas each of which has a base station, as well known in the art. Each divided area is called a radio zone. Each zone is assigned with a single available radio channel among a plurality of radio channels.

The digital mobile telephone set 30 comprises a telephone set antenna 31, a receiving-side radio section (RX RF) 32 connected to the antenna 31, a channel decoder 33 connected to the receiving-side radio section 32, a speech decoder 34 connected to the channel decoder 33, a first digital adders adder 35a, a second digital adder 35b connected to the speech decoder 34, a digital/analog (D/A) converter 36 connected to the second digital adder 35b, a switching (SW) circuit 17 connected to the D/A converter 36, a speaker amplifier 38 connected to the SW circuit 37, a loudspeaker 39 connected to the speaker amplifier 38, a receiver amplifier 41 connected to the SW circuit 37, a receiver 42 connected to the receiver amplifier 41, first and second adaptive echo cancellers 43a and 43b connected to the first and the second digital adders 35a and 35b, respectively, a controller 44 connected to the first and the second digital adders 35a and 35b, to the first and the second adaptive echo cancellers 43a and 43b, and to the SW circuit 37, a microphone 45 placed in the vicinity of the loudspeaker 39 and the receiver 42, a microphone amplifier 46 connected to the controller 44 and the microphone 45, an analog/digital (A/D) converter 47 connected to the microphone amplifier 46 and the first digital adder 35a, a speech coder 48 connected to the first digital adder 35a, a channel coder 49 connected to the speech coder 48, and a transmitting-side radio section 51 connected to the channel coder 49 and the telephone set antenna 31.

The counterpart section 60 comprises a base station antenna 61, a base station 62 connected to the base station antenna 61, a counterpart terminal circuit 63 connected to the base station 62, and a counterpart terminal handset 64 connected to the counterpart terminal circuit 63. The counterpart terminal handset 64 comprises a receiver 65 and a microphone 66 which are connected to the counterpart terminal circuit 63.

In the counterpart section 60, a counterpart-side transmission speech sound is generated by a speaker using the counterpart terminal handset 64. The counterpart-side transmission speech sound is converted by the microphone 66 into a counterpart-side speech transmission signal. The counterpart-side speech transmission signal is delivered to the base station 62 through the counterpart terminal circuit 63 and is emitted as a counterpart-side speech transmission radio wave from the base station antenna 61.

In the digital mobile telephone set 30, the counterpart-side speech transmission radio wave is received as a telephone-side speech reception radio wave by the telephone set antenna 31. Responsive to the telephone-side speech reception radio wave, a combination of the telephone set antenna 31 and the receiving-side radio section 32 produces an original reception signal. Thereafter, the channel decoder 33 extracts, as a predetermined signal, a signal of a predetermined channel alone from the original reception signal. The predetermined signal is decoded by the speech decoder 34 into a processed reception signal. A combination of the receiving-side radio section 32, the channel decoder 33, and the speech decoder 34 will be referred to as a specific processing arrangement for processing the original reception signal into the processed reception signal. The processed reception signal is supplied to the second digital adder 35b.

The second digital adder 35b carries out a specific calculation between the processed reception signal and a specific signal which is supplied from the second adaptive echo canceller 43b. The second digital adder 35b produces, as a telephone-side digital reception speech signal, a specific calculation result signal representative of a result of the specific calculation. The second digital adder 35b will be referred to as a specific calculation arrangement.

The D/A converter 36 converts the telephone-side digital reception speech signal into a telephone-side analog reception speech signal. The telephone-side analog reception speech signal is supplied to the switching circuit 37.

As will later be described, the switching circuit 37 is responsive to a switch control signal supplied from the controller 44 and selects one of those paths leading to the speech receiving loudspeaker 39 and to the receiver 42.

When the switching circuit 37 selects the path to the receiver 42, the telephone-side analog reception speech signal is supplied through the receiver amplifier 41 to the receiver 42. The receiver 42 produces, as the first reception speech sound, a telephone-side reception speech sound which is a reproduction of the counterpart-side transmission speech sound. The receiver 42 is referred to as a first sound producing arrangement.

When the switching circuit 37 selects the path to the loudspeaker 39, the telephone-side analog reception speech signal is supplied through the speaker amplifier 38 to the loudspeaker 39. The loudspeaker 39 produces, as a second reception speech sound, the telephone-side reception speech sound. The loudspeaker 39 is referred to as a second sound producing arrangement.

In the manner known in the art, the receiver 42 and the loudspeaker 39 are designed so that the second reception speech sound is greater than the first reception speech sound in volume level. It is assumed that each of the first and the second reception speech sounds has a part supplied as a telephone-side transmission sound to the microphone 45 together with a transmission speech sound which is generated by a user of the digital mobile telephone set 30.

The microphone 45 converts the telephone-side transmission sound into a local signal. The microphone amplifier 46 amplifies the local signal into a telephone-side analog transmission speech signal under control by the controller 44. On controlling the microphone amplifier 46, the controller 44 will be referred to as an additional control arrangement. A combination of the microphone 45 and the microphone amplifier 46 is referred to as a converting arrangement.

The telephone-side analog transmission speech signal is supplied to the A/D converter 47. The A/D converter 47 converts the telephone-side analog transmission speech signal into a telephone-side digital transmission speech signal. The telephone-side digital transmission speech signal is supplied to the first digital adder 35a. It is to be noted that the telephone-side digital transmission speech signal includes an acoustic echo signal which is dependent on the part of each of the first and the second reception speech sounds.

The first digital adder 35a carries out a particular calculation between the telephone-side digital transmission speech signal and a particular signal which is supplied from the first adaptive echo canceller 43a. The first digital adder 35a produces, as an adjusted signal, a particular calculation result signal representative of a result of the particular calculation. The first digital adder 35a will be referred to as a particular calculation arrangement. A combination of the first digital adder 35a and the first adaptive echo canceller 43a is referred to as a particular adjusting arrangement.

The particular calculation result signal is supplied to the speech coder 48 and is coded into a speech coded signal therein. The speech coded signal is converted by the channel coder 49 into a signal of a predetermined channel. The signal is modulated by the transmitting-side radio section 51 into a processed transmission signal and is emitted as a telephone-side speech transmission radio wave from the telephone set antenna 31. A combination of the speech coder 48, the channel coder 49, and the transmitting-side radio section 51 will be referred to as a particular processing arrangement for processing the particular calculation result signal into the processed transmission signal.

In the counterpart section 60, the telephone-side speech transmission radio wave is received by the base station antenna 61 as a counterpart-side speech reception radio wave which is modulated by the base station 62 and then supplied through the counterpart terminal circuit 63 to the counterpart terminal handset 64. The receiver 65 produces a counterpart-side reception speech sound which is a reproduction of the telephone-side transmission speech sound.

For cancelling the acoustic echo signal, the digital mobile telephone set 30 comprises an echo cancelling apparatus which is formed by a combination of the first and the second digital adders 35a and 35b, the first and the second adaptive echo cancellers 43a and 43b, and the controller 44. The echo cancelling apparatus has an operation which will be described in the following.

The first adaptive echo canceller 43a is supplied with the telephone-side digital reception speech signal through the controller 44 and produces a telephone-side pseudo echo signal as the particular signal, as optimized. The first digital adder 35a adds the telephone-side pseudo echo signal to the telephone-side digital transmission speech signal. As a result, cancellation is carried out on the acoustic signal included in the telephone-side digital transmission speech signal. The first adaptive echo canceller 43a will be referred to as a particular signal producing arrangement.

In the similar manner, the second adaptive echo canceller 43b is supplied with the particular calculation signal through the controller 44 and produces a counterpart-side pseudo echo signal as the specific signal to the processed reception signal. As a result, cancellation is carried out about an acoustic echo signal included in the processed reception signal. The second adaptive echo canceller 43b will be referred to as a specific signal producing arrangement. A combination of the second adaptive echo canceller 43b and the second digital adder 35b will be referred to as a specific adjusting arrangement.

The controller 44 confirms results of the echo cancelling operations executed by the first and the second digital adders 35a and 35b and delivers optimization instructions to the first and the second adaptive echo cancellers 43a and 43b. In response to a hands-free control signal (HF CONT) supplied as a selection signal from an external unit, the controller 44 delivers the switch control signal to the switching circuit 37 to make the switching circuit 37 carry out switching between the receiver amplifier 41 and the speaker amplifier 38. Correspondingly, the controller 44 produces a gain control signal to adjust a gain of the microphone amplifier 46. In addition, the controller 44 controls operation of the first and the second adaptive echo cancellers 43a and 43b to optimize the telephone-side and the counterpart-side pseudo echo signals. In other words, the controller 44 is responsive to the hands-free control signal and makes the cancellation be favorably carried out about the acoustic echo signals.

The switching circuit 37 is responsive to the switch control signal and switches a speech reception path from a direction of the receiver amplifier 41 and the receiver 42 to a direction of the speaker amplifier 38 and the loudspeaker 39. A combination of the switching circuit 37 and the controller 44 is referred to as a selecting arrangement for selecting supply of the telephone-side analog reception speech signal between the loudspeaker 39 and the receiver 42.

In response to the gain control signal, the microphone amplifier 46 can select the gain thereof from two levels corresponding to the handset communication and the hand-free communication.

Next, the description proceeds to an operation of the digital mobile telephone set 30. At first, an operation during the handset communication will be described. At this time, it is assumed that the switching circuit 37 selects the path leading to the receiver amplifier 41, as illustrated in FIG. 2.

The specific calculation result signal is divided into a first and a second part. The first part of the specific calculation result signal is supplied to the D/A converter 36 and converted therein into the telephone-side analog reception speech signal which is amplified by the receiver amplifier 41. The receiver 42 produces the first reception speech sound. The second part of the specific calculation result signal is supplied through the controller 44 to the first adaptive echo canceller 43a. Responsive to the second part, the first adaptive echo canceller 43a produces the telephone-side pseudo echo signal, namely, the particular signal that is supplied to the first digital adder 35a.

It will be assumed that the part of the first reception speech sound enters into or is supplied to the microphone 45 as a part of the telephone-side transmission sound. Responsive to the transmission sound, the microphone 45 generates the local signal. The local signal is amplified into the telephone-side analog transmission speech signal by the microphone amplifier 46. The telephone-side analog transmission speech signal is converted into a telephone-side digital transmission speech signal by the A/D converter 47. The telephone-side digital transmission speech signal is supplied to the first digital adder 35a. It is to be noted that the telephone-side digital transmission speech signal includes the above-mentioned acoustic echo signal that is dependent on the part of the first reception speech sound.

The first digital adder 35a adds the above-mentioned telephone-side pseudo echo signal to the telephone-side digital transmission speech signal to carry out an operation of cancelling the acoustic echo signal. The controller 44 confirms the result of the echo cancelling operation and delivers the optimization instruction to the first adaptive echo canceller 43a so as to cancel the echo signal.

By repeating the above-mentioned operation, it is possible to prevent generation of the acoustic echo signal giving a strange feeling.

On the other hand, the particular calculation signal is divided into a first and a second parts. The first part of the particular calculation signal is delivered through the speech coder 48, the channel coder 49, and the transmitting-side radio section 51 and is emitted as the telephone-side transmission radio wave from the telephone set antenna 31. The second part of the particular calculation result signal is supplied through the controller 44 to the second adaptive echo canceller 43b. The second adaptive echo canceller 43b produces the optimized counterpart-side pseudo echo signal.

The telephone-side transmission radio wave is received by the base station antenna 61 as a counterpart-side reception signal which passes through the base station 62 and the counterpart terminal circuit 63. The receiver 65 of the counterpart terminal handset 64 produces the counterpart-side reception speech sound which is a reproduction of the telephone-side transmission speech sound.

A part of the counterpart-side reception speech sound is rendered into a counterpart-side acoustic return sound and supplied to the microphone 66. Responsive to the counterpart-side acoustic return sound, the microphone 66 generates counterpart-side acoustic echo signal. On the other hand, the counterpart-side reception signal has a part produced as a hybrid echo signal in the base station 62 and the counterpart terminal circuit 63. The counterpart-side acoustic echo signal and the hybrid echo signal are collectively called a counterpart-side echo signal. The counterpart-side echo signal is supplied through the base station antenna 61, the telephone set antenna 31, the receiving-side radio section 32, the channel decoder 33, and the speech decoder 34 to the second digital adder 35b.

The second digital adder 35b adds the optimized counterpart-side pseudo echo signal to the telephone-side speech reception signal to carry out an operation of cancelling the counterpart-side echo signal. The controller 44 confirms the result of the echo cancelling operation executed by the second digital adder 35b and delivers the optimization instruction to the second adaptive echo canceller 43b so as to cancel the counterpart-side echo signal.

By repeating the above-mentioned operation, it is possible to cancel the counterpart-side echo signal giving a strange feeling, which is produced in the counterpart section 60.

Next, description will be made with regard to an operation in a case where a hands-free communication mode is selected by manipulation of a key (not shown). In this event, the hands-free control signal is supplied as a selection signal to the controller 44. In response to the hands-free control signal, the controller 44 delivers the switch control signal and the gain control signal to the switching circuit 37 and the microphone amplifier 46, respectively. In response to the switch control signal, the switching circuit 37 switches a speech reception path, namely, a flow of the speech reception signal from the direction of the receiver 42 to the direction of the loudspeaker 39. In response to the gain control signal, the microphone amplifier 46 switches the gain to the level corresponding to the hands-free communication. Thus, the hands-free communication is enabled. In addition, the controller 44 controls the first adaptive echo canceller 43a so that the telephone-side pseudo echo signal makes the particular calculation result signal have a level which is similar to a level in a case where the handset communication is carried out.

In the hands-free communication also, the operation similar to that in the handset communication as described above is carried out. As a result, it is possible to cancel the echo signal that is dependent on the second reception speech sound. In addition, it is possible to cancel the counterpart-side echo signal.

While the present invention has thus far been described in connection with a single embodiment thereof, it will readily be possible for those skilled in the art to put this invention into practice in various other manners. For example, the telephone set may comprise three or more producing arrangements although the description is made about a case where the telephone set comprises two producing arrangements.

What is claimed is:

1. A telephone set comprising:

first sound producing means, responsive to a reception speech signal, for producing a first reception speech sound;

second sound producing means, responsive to said reception speech signal, for producing a second reception speech sound which is greater than said first reception speech sound in volume level;

selecting means connected to said first and said second sound producing means and responsive to a selection signal for selectively supplying said reception speech signal to one of said first and said second sound producing means;

converting means for converting a transmission speech sound into a transmission speech signal;

particular adjusting means connected to said converting means for producing an adjusted signal for adjusting said transmission speech signal with reference to said reception speech signal; specific processing means for processing an original reception signal into a processed reception signal;

specific adjusting means, connected to said specific processing means, and to the selected one of said first and said second sound producing means through said selecting means, for adjusting said processed reception signal with reference to said adjusted signal to produce said reception speech signal; and control means connected to said particular adjusting means and to said specific adjusting means and responsive to said selection signal for controlling operation of said particular adjusting means and said specific adjusting means, wherein said adjusted signal is optimized by said control means for use by said specific adjusting means.

2. A telephone set as claimed in claim 1, further comprising additional control means which is connected to said converting means and is responsive to said selection signal for controlling operation of said converting means.

3. A telephone set as claimed in claim 2, wherein said converting means comprises:

a microphone responsive to said transmission speech sound for producing a local signal; and a microphone amplifier connected to said microphone, to said particular adjusting means, and to said additional control means for amplifying said local signal into said transmission speech signal under control of said additional control means.

4. A telephone set as claimed in claim 1, wherein said particular adjusting means comprises:

particular signal producing means, responsive to said reception speech signal, for producing a particular signal relating to said reception speech signal; and particular calculating means, connected to said particular signal producing means and to said converting means, for carrying out a particular calculation between said transmission speech signal and said particular signal to produce a particular calculation result signal.

5. A telephone set as claimed in claim 4, further comprising particular processing means connected to said particular calculation means for processing said particular calculation result signal into a processed transmission signal to be transmitted from said telephone set.

6. A telephone set as claimed in claim 1, wherein said specific adjusting means comprises:

specific signal producing means, connected to said particular adjusting means and responsive to said adjusted signal, for producing a specific signal relating to said adjusted signal; and specific calculating means, connected to said specific signal producing means, to said specific processing means, and to the selected one of said first and said second sound producing means through said selecting means, for carrying out a specific calculation between said specific and said processed reception signal to produce, as said reception speech signal, a specific calculation result signal representative of a result of said specific calculation.

7. A method of cancelling an echo signal in a telephone set comprising first sound producing means, responsive to a reception speech signal, for producing a first reception speech sound, second sound producing means, responsive to said reception speech signal, for producing a second reception speech sound which is greater than said first reception speech sound in volume level, selecting means, responsive to a selection signal, for selectively supplying said reception speech signal to one of said first and said second sound producing means, converting means for converting a transmission speech sound into a transmission speech signal, particular adjusting means connected to said converting means for producing an adjusted signal for adjusting said transmission speech signal with reference to said reception speech signal, specific processing means for processing an original reception signal into a processed reception signal; and specific adjusting means, connected to said processing means, to said particular adjusting means, and to the selected one of said first and said second sound producing means through said selecting means, for adjusting said processed reception signal with reference to said adjusted signal to produce said reception speech signal, said method comprising the steps of:

inputting said original reception signal to said telephone set;

selecting a mode of operation of said telephone set by setting said selection signal;

controlling operation of said particular adjusting means in response to said selection signal to produce said adjusted signal regardless of whether the first or second producing means is selected by said selecting means; and producing said reception speech signal for input to the selected one of said first and second sound producing means, in accordance with said adjusted signal.

8. A telephone set comprising:

first sound producing means, responsive to a reception speech signal, for producing a first reception speech sound;

second sound producing means, responsive to said reception speech signal, for producing a second reception speech sound which is greater than said first reception speech sound in volume level;

selecting means connected to said first and said second sound producing means and responsive to a selection signal for selectively supplying said reception speech signal to one of said first and said second sound producing means;

converting means for converting a transmission speech sound into a transmission speech signal, said transmission speech sound including a portion of at least one of said first and second reception speech sounds;

particular adjusting means connected to said converting means for producing an adjusted signal for adjusting said transmission speech signal with reference to said reception speech signal;

control means connected to said particular adjusting means and responsive to said selection signal for controlling operation of said particular adjusting means to produce the adjusted signal, regardless of whether the first or second sound producing means is selected by said selecting means.

9. A telephone set according to claim 8, further comprising:

specific processing means for processing an original reception signal into a processed reception signal; and specific adjusting means, connected to said processing means, to said particular adjusting means, and to the selected one of said first and said second sound producing means through said selecting means, for adjusting said processed reception signal with reference to said adjusted signal to produce said reception speech signal.

10. A telephone set as claimed in claim 8, further comprising additional control means which is connected to said converting means and is responsive to said selection signal for controlling operation of said converting means.

11. A telephone set as claimed in claim 10, wherein said converting means comprises:

a microphone responsive to said transmission speech sound for producing a local signal; and a microphone amplifier connected to said microphone, to said signal adjusting means, and to said additional control means for amplifying said local signal into said transmission speech signal under control of said additional control means.

* * * * *